United States Patent

[11] 3,625,438

[72] Inventors  Cornelis van der Lely
               7 Bruschenrain, Zug, Switzerland;
               Ary van der Lely, 10 Weverskade,
               Maasland, Netherlands
[21] Appl. No. 882,229
[22] Filed     Dec. 4, 1969
[45] Patented  Dec. 7, 1971
[32] Priority  Dec. 13, 1968
[33]           Netherlands
[31]           6817892

[54] SPREADING IMPLEMENTS WITH VARIABLE DRIVE
     18 Claims, 7 Drawing Figs.
[52] U.S. Cl. .......................................... 239/670,
                                                    239/675
[51] Int. Cl. ........................................... A01c 19/00
[50] Field of Search ............................ 239/670,
                                              672, 675, 677

[56]                References Cited
              UNITED STATES PATENTS
1,824,419   9/1931   Abbe ............................ 239/672
2,296,474   9/1942   Kucera ......................... 239/670 X
2,828,130   3/1958   Hill .............................. 239/670
3,218,083   11/1965  van der Lely et al. ......... 239/675
3,395,866   8/1968   Sousek et al. ................. 239/670

Primary Examiner—Lloyd L. King
Assistant Examiner—John J. Love
Attorney—Mason, Mason & Albright ABSTRACT: A spreading implement including a hopper supported on a wheeled frame, a spreader located at the lower portion of the hopper below an outlet port and a feeding member within the hopper to urge granular or powdery material towards the outlet port. A transmission is connectable to a power takeoff and has several coupling points to power the feeding member at different speeds while the spreading member can be rotated at the same speed from either coupling point. In one embodiment, the feeding member can be clutched inoperative.

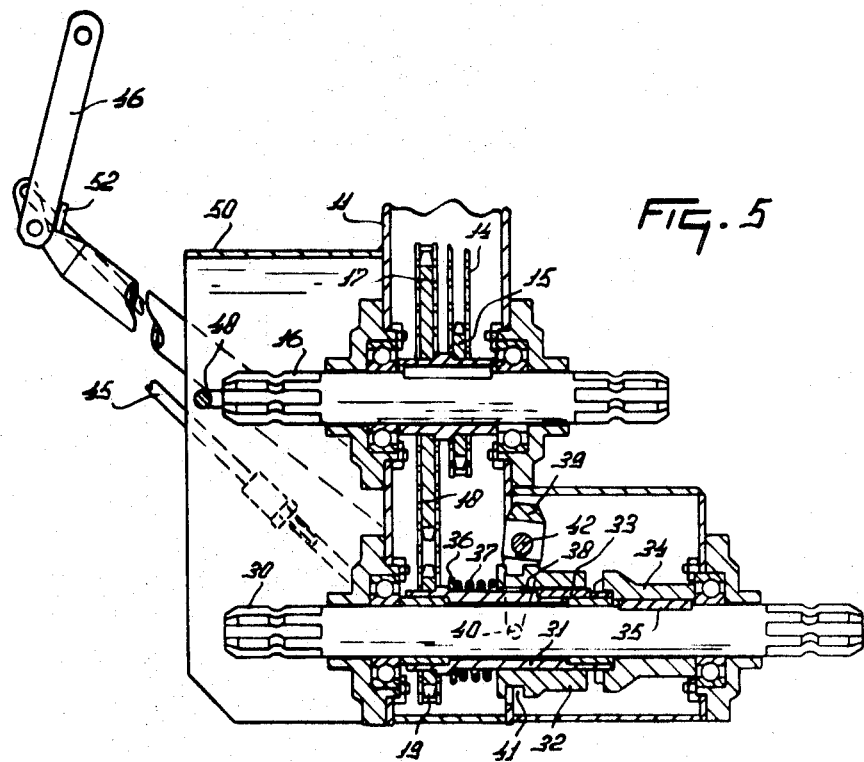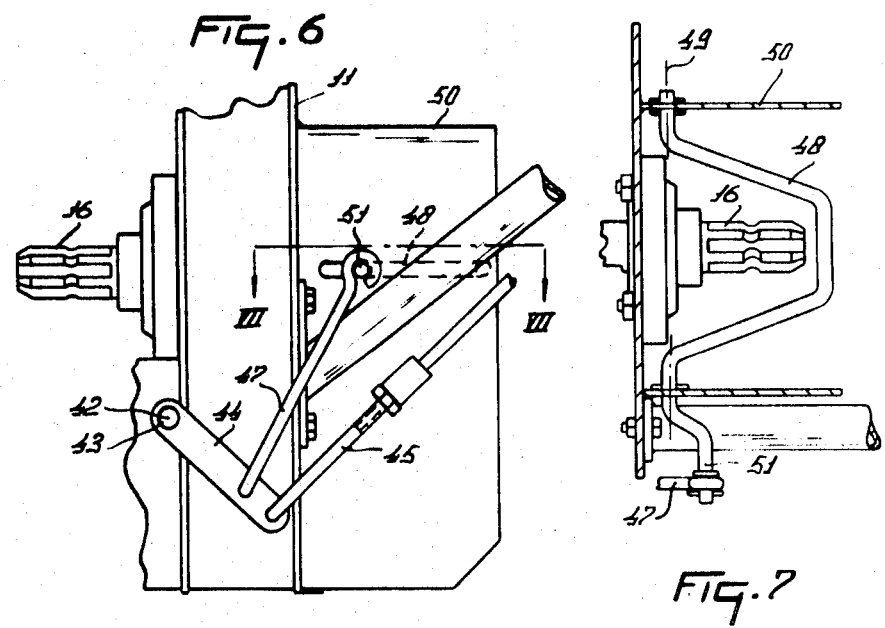

SPREADING IMPLEMENTS WITH VARIABLE DRIVE

Figure 1:
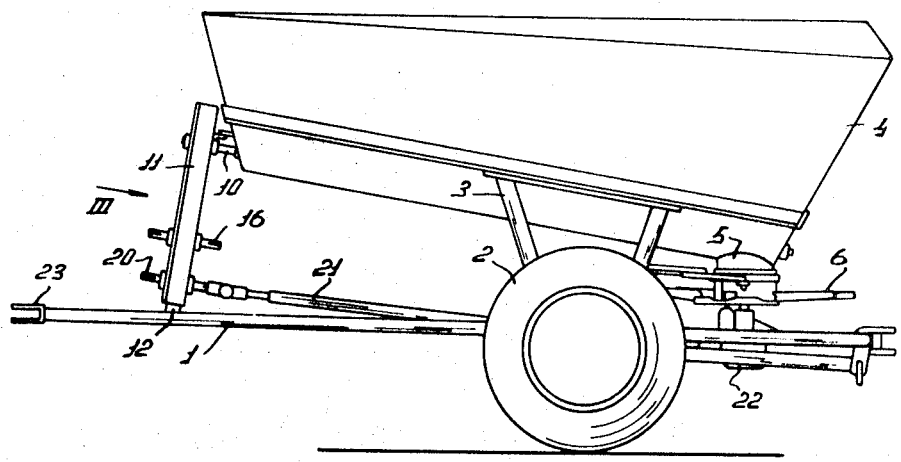
Figure 3:
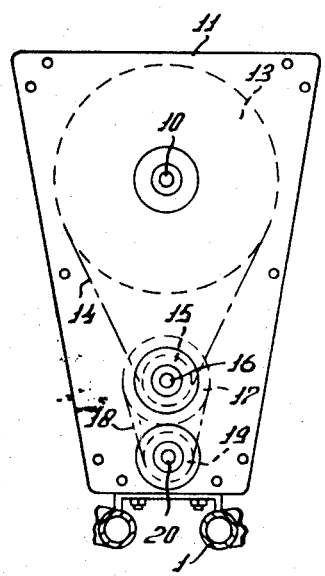
Figure 2:
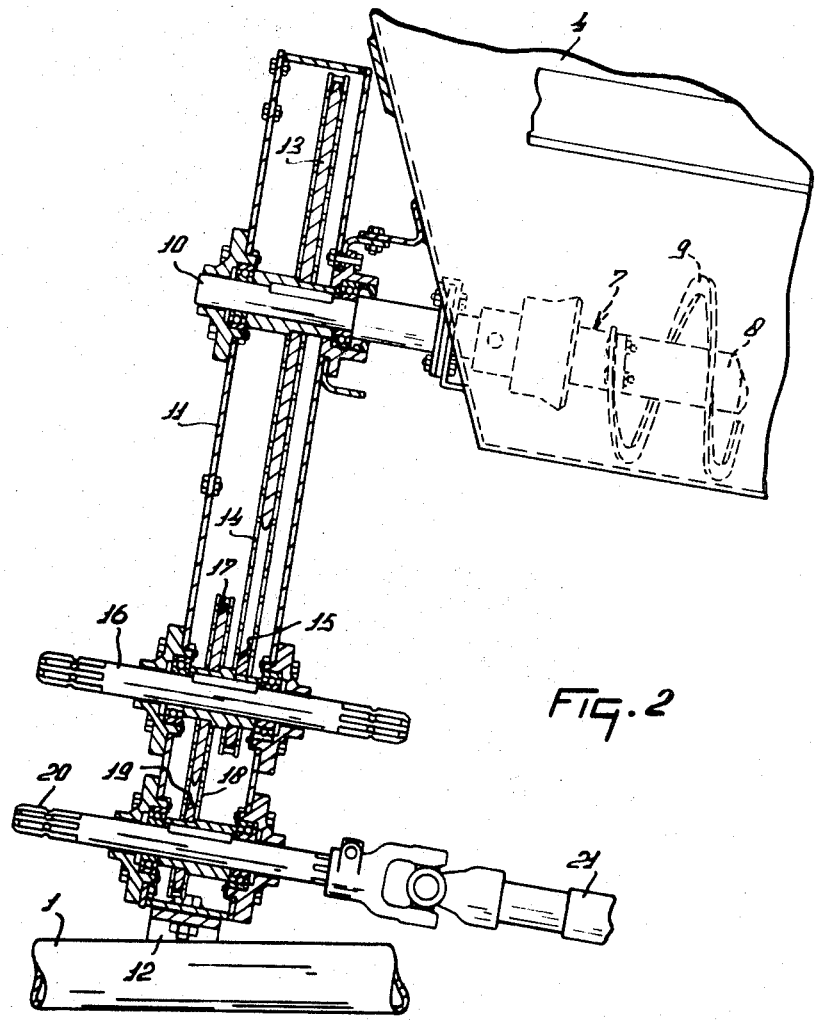
Figure 4:
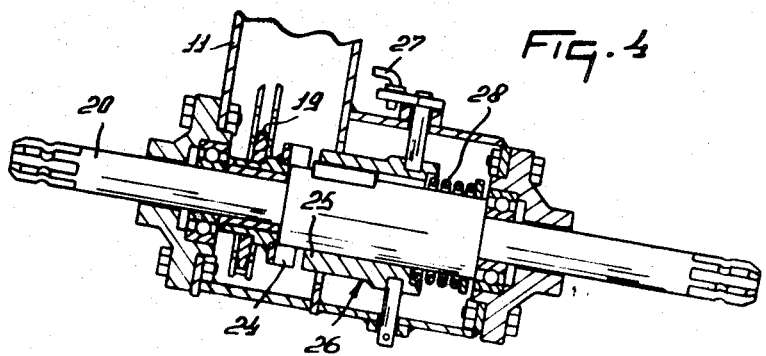

For a better understanding of the invention, and to show how the same may be carried into effect, reference will now be made, by way of example, to the accompanying drawings, in which:

FIG. 1 is a side elevation of a spreading implement in accordance with the invention, FIG. 2 is a sectional side elevation, to an enlarged scale, showing the arrangement of moving parts at the front of the implement, FIG. 3 is a scrap front view as seen in the direction indicated by an arrow III in FIG. 1, certain frame parts being shown in section and the view being to a scale intermediate that of FIGS. 1 and 2, FIG. 4 is a scrap section, to an enlarged scale, generally corresponding to FIG. 2 but illustrating an alternative construction of certain parts, FIG. 5 substantially corresponds to FIG. 3 but is to a larger scale showing an alternative construction, FIG. 6 is a scrap external elevation substantially corresponding to FIG. 5 but viewed from the opposite side of the implement, and FIG. 7 is a section taken on the line VII—VII of FIG. 6.

Referring first to FIGS. 1 to 3 of the drawings, the spreading implement which is illustrated has a frame 1 that is provided with ground wheels 2 that enable it to be towed over the ground by an agricultural tractor or other vehicle. The frame 1 includes a supporting structure 3 for an elongated container in the form of a hopper 4 which is approximately V-shaped when seen in vertical cross section, the lowermost point of the V being rounded and the hopper being elongated in a substantially horizontal direction that is generally parallel to the intended direction of operative travel of the implement. The lowermost and rearmost end of the bottom of the hopper 4 is provided with a substantially cylindrical outlet port 5 that communicates with a rotary bladed spreading member 6 which is supported from underlying parts of the frame 1 in such a way that it can be lowered when required to facilitate access for cleaning, maintenance and so on.

A feeding member 7 (FIG. 2) is located internally of the hopper 4 just above the bottom thereof and is arranged to displace granular or powdered materials within the hopper 4 towards the outlet port 5 with an agitating effect designed to prevent bridging, caking and the like of such materials as far as possible. The implement is intended for the spreading of materials such, purely for example, as granular artificial fertilizers, lime, sand, seeds and so on. The feeding member 7 extends lengthwise of the bottom of the hopper 4 and comprises a central support shaft 8 around which, with appreciable clearance, is wound a spring steel helix 9 of strip-shaped formation, the helix 9 being secured to the support shaft 8 towards the leading and rearmost ends of the latter. Alternatively, a plurality of separate shorter, but otherwise similar, helices may be provided. The leading end of the central support shaft 8 is releasably connected to a forwardly projecting and relatively coaxial stub shaft 10 that is entered through a substantially sealed bearing in the front wall of the hopper 4. The forwardly projecting part of the stub shaft 10 is rotatably journaled in a transmission casing 11 whose bottom is fastened to the frame 1 by a support 12 and whose rear wall is secured to the front of the hopper 4 with the aid of lugs and bolts in the manner which can be seen in FIG. 2 of the drawings. It will be evident from FIGS. 1 and 2 of the drawings that the transmission casing 11 occupies an upright position but that its general plane is inclined to the vertical by a few degrees in such a way that the bottom thereof is disposed further forwardly with respect to the intended direction of operative travel of the implement than is the top thereof.

A sprocket wheel 13 is fastened to the stub shaft 10 internally of the transmission casing 11, the sprocket wheel 13 being in driven connection with a smaller sprocket wheel 15 by way of an endless transmission chain 14. The sprocket wheel 15 is mounted on a shaft 16 rotatably journaled in the front and rear walls of the casing 11 so as to extend parallel to the stub shaft 10 at a position beneath that stub shaft. As can be seen from the drawings, the shaft 16 projects outwardly from the casing 11 through both the front and rear walls of the latter, the projecting ends of the shaft 16 both being splined. The shaft 16 is provided, inside the casing 11 at a position close to the sprocket wheel 15, with a sprocket wheel 17 which is intermediate in size between the two sprocket wheels 13 and 15. The sprocket wheel 17 is in driven connection with a sprocket wheel 19 by way of an endless transmission chain 18. The sprocket wheel 19, which is of the same size as the aforementioned sprocket wheel 15, is fastened to a shaft 20 that is of similar length to the shaft 16, it being parallel thereto and formed with splines at its opposite projecting ends in the same way as is the shaft 16. The shaft 20 is located beneath the shaft 16 and it will be seen from FIG. 3 of the drawings that the longitudinal axes of the stub shafts 10 and the two shafts 16 and 20 are contained in a common substantially vertical plane that extends parallel to the intended direction of operative travel of the implement. The rearmost projecting end of either the shaft 16 or the shaft 20 can be connected by a universal joint to the leading end of a telescopic transmission shaft 21 whose rearmost end is connected by a further universal joint (not shown) to the input shaft of a gear box 22 whose substantially vertical output shaft affords the drive to the rotary spreading member 6. FIGS. 1 and 2 of the drawings show the leading end of the transmission shaft 21 connected to the rearmost end of the shaft 20.

In the use of the implement which has been described, a coupling bracket at the leading end of a draw bar 23 is secured to the tow bar or hitch of an agricultural tractor or other vehicle while the leading end of either the shaft 16 or the shaft 20 is placed in driven connection with the power takeoff shaft of the same tractor or other vehicle with the aid of an intermediate telescopic transmission shaft (not shown) of known construction having universal joints at its opposite ends. It will be appreciated that the arrangement of the transmission parts contained within the casing 11 is such that the feeding member 7 will be driven at a different speed, in response to a constant speed of rotation of the power takeoff shaft from which the drive is originally derived, in dependence upon whichever of the two coupling points (afforded by the leading ends of the two shafts 16 and 20) is chosen. When, as illustrated, the coupling point afforded by the leading end of the lower shaft 20 is chosen, the feeding member 7 is driven through the intermediary of the chains 14 and 18 at a reduced speed consequent upon the double speed reduction derived from the relationship between the small sprocket wheel 19 and the larger sprocket wheel 17 and the small sprocket wheel 15 and the larger sprocket wheel 13. The speed of rotation of the spreading member 6 is not influenced by the transmission within the casing 11 since the drive to said spreading member is transmitted solely by way of the shaft 20. Any difference in the speed of rotation which there may be between the power takeoff shaft and the spreading member 6 will be solely as a result of any speed-changing transmission members that are located within the gear box 22.

If it is desired to increase the speed of rotation of the feeding member 7 relative to a constant speed of rotation of the power takeoff shaft, so that the material within the hopper 4 will be more vigorously agitated and fed to the outlet port 5 at a greater rate, the coupling point afforded by the leading end of the shaft 16 is chosen for indirect connection to the power takeoff shaft of the tractor or other vehicle. There is then only a single speed reduction relationship between the shaft 16 and the stub shaft 10 by way of the sprocket wheels 15 and 13 that are drivingly interconnected by the chain 14. If, as will almost invariably be the case, it is desired to maintain the speed of the spreading member 6 unaltered, the universal joint at the leading end of the transmission shaft 21 is disconnected from the shaft 20 and is reconnected to the rearmost end of the shaft 16 so that a direct drive to the shaft 21 is reestablished through the casing 11 solely by way of the shaft 16.

The construction which has been described enables two different speeds of rotation of the feeding member 7 to be attained in a very simple but effective manner in response to a single speed of rotation of a power takeoff shaft. The transmission parts which have been described afford a strong and reliable mechanism which is not adversely affected by dirt to any great extent. Nevertheless, any parts which should become worn or damaged are readily accessible and can be replaced quickly and easily.

FIG. 4 of the drawings shows an alternative embodiment in which the lowermost sprocket wheel 19 is freely rotatable upon a bearing member surrounding the shaft 20. However, said bearing member is provided with rearwardly directed dogs or claws 24 which are arranged to cooperate with the forwardly directed dogs or claws 25 of a dog or claw clutch 26 the body of which is axially displaceable along the shaft 20 with the aid of splines formed on that shaft. A control rod 27 (only one end of which is visible in FIG. 4) is provided to move the body of the clutch 26 along the shaft 20 to engage and disengage the clutch with consequent rotation or lack of rotation of the feeding member 7. The feeding member 7 can thus be rendered inoperative for chosen lengths of time upon too rapid a buildup of the material around the outlet port 5. A helical compression spring 28 forming part of the clutch 26 tends to maintain that clutch in engagement when the control rod 27 is operated to allow the dogs or claws 24 and 25 to contact one another and transmit rotation from the shaft 20 to the sprocket wheel 19.

FIGS. 5, 6 and 7 of the drawings illustrate an embodiment in which the lowermost shaft 20 is replaced by a shaft 30 around which a sleeve 31 is rotatable, the sleeve 31 having the sprocket wheel 19 fixedly secured to it. One half 32 of a dog or claw clutch surrounds the sleeve 31 and is prevented from rotating relative thereto by a key 33. However, the key 33 is entered in an internal groove or keyway 38 so that the clutch half 32 can slide axially along the sleeve 31 without rotating relative thereto. The other half 34 of the dog or claw clutch surrounds the shaft 30 and is prevented from rotating relative thereto by a key 35. A stop ring 36 surrounds the sleeve 31 near the sprocket wheel 19 and a helical compression spring 37 which surrounds the sleeve 31 bears between said ring 36 and the neighboring end of the clutch half 32.

The clutch half 32 can be displaced axially along the sleeve 31 with the aid of a bracket 39 carrying opposed pins 40 which locate slidably in a groove 41 formed around the external surface of the clutch half 32. The bracket 39 is turnable about the longitudinal axis 42 of a shaft 43 to which the bracket is rigidly secured. An arm 44 (FIG. 6) has one end fastened to the shaft 43 and its opposite end pivotally connected to one end of a rod 45 that is adjustable in length. The opposite end of the rod 45 is connected to a control arm 46. A rod 47 is also connected to the arm 44 at a point located along that arm towards the shaft 43 from the end at which the junction with the rod 45 is located. The opposite end of the rod 47 is pivotally connected to a crank 51 that forms part of a bracket 48 turnably mounted in the opposite walls of a cowl 50 that protectively surrounds the forwardly projecting ends of the shafts 16 and 30. The bracket 48 is due turnable relative to the cowl 50 about a substantially horizontal axis 49 (FIG. 7).

When the bracket 48 occupies the position shown in FIGS. 5 to 7 of the drawings, part thereof is located immediately in front of the leading end of the upper shaft 16 so that no connection between that shaft 16 and the power takeoff shaft of a tractor or other vehicle can be made, the dog or claw clutch 32, 34 remaining disconnected. The spring 37 acts to maintain the described positions of the parts just mentioned, the control arm 46 bearing against a stop 52 (FIG. 5). The control arm 48 extends forwardly to a position in which it is really readily accessible from the driving seat of the agricultural tractor or other vehicle which operates the implement during the use thereof. Since the shaft 16 cannot be used in the illustrated position of the various parts due to the disposition of the bracket 48, only the lower shaft 30 can be employed so that the feeding member 7 will rotate at the slower of the two possible rates. When it is desired to use the shaft 16, the control arm 46 is moved to turn the bracket 48 downwardly away from its blocking position whereupon the two halves 32 and 34 of the dog or other clutch become engaged since the spring 37 can then move the clutch half 32 to the right as seen in FIG. 5 of the drawings instead of such movement being resisted by the opposed pins 40.

It will be noted that, if the leading end of the shaft 16 were not blocked by the bracket 48 when the dog or claw clutch is retained in the disconnected condition illustrated in FIG. 5 of the drawings, positive rotation of the shaft 16 from the power takeoff shaft of a tractor or other vehicle would tend to rotate the clutch half 32 with the shaft 30 so that rapid wear of the pins 40 and the groove 41 with which they cooperate would take place. The bracket 48 makes such undesired wear substantially impossible by blocking erroneous or accidental connection of the power takeoff shaft to the shaft 16 when the dog or claw clutch 32, 34 is disengaged.

It is not essential to use dog or claw clutches in the embodiments of FIG. 4 and FIGS. 5 to 7 of the drawings, other spring-loaded clutches, such as friction clutches, being equally effective. Moreover, a similar clutch may be provided in respect of the shaft 16, such clutch being additional to, or in place of, the clutch that is provided in association with the shaft 20 or 30.

Having thus described my invention what I claim as new and desire to secure by Letters Patent of the United States is:

1. A spreading implement for granular and powdery material comprising a wheeled frame and a hopper mounted on said frame, an outlet port in the bottom of said hopper, adjacent the rear thereof and a spreader member rotatably mounted below said port, a movable feeding member positioned within said hopper to urge material towards said port and a transmission at the front of said implement connected to move said feeding member and rotate said spreading member, said transmission including at least two rotatable shafts with at least one sprocket wheel mounted on each of said shafts and endless member means connecting said sprocket wheels to one another and to said feeding member, said shafts being alternatively connectable at their forward ends with a power takeoff and alternatively connectable at their rear ends with a drive shaft geared to rotate said spreading member, clutch means on one of said shafts to disengage said transmission from moving said feeding member while continuing to operate said drive shaft and to rotate said spreading member.

2. A spreading implement for powdery and granular materials comprising a hopper supported on a frame, an outlet port in the lower part of said hopper and a spreader member rotatably mounted below said port, a rotatable feeding member mounted for movement in said hopper to urge material towards said outlet port, a transmission with power takeoff coupling means on said implement connected to rotate said feeding member, said power takeoff coupling means including a plurality of coupling points which are alternatively connectable to a power takeoff shaft to rotate said feeding member at different transmission ratios and drive shaft means connecting said spreader member to said coupling means.

3. An implement as claimed in claim 2, wherein said coupling points are rotatable drive shafts located one above the other and interconnected by transmission members of said transmission to provide a speed-changing transmission ratio between said rotatable drive shafts.

4. An implement as claimed in claim 3, wherein said transmission members are connected to said two shafts and comprise two sprocket wheels of different sizes interconnected with a transmission chain, the smaller one of said two sprocket wheels being mounted on the lower of said two shafts and the larger sprocket wheel being mounted on the upper shaft.

5. An implement as claimed in claim 4, wherein said feeding member is connected to a stub shaft, said stub shaft being drivenly linked to said upper shaft.

6. An implement as claimed in claim 5, wherein a third sprocket wheel mounted on said upper shaft is in driving connection with a larger sprocket wheel mounted on said stub shaft and said connection includes a further transmission chain.

7. An implement as claimed in claim 6, wherein said third sprocket wheel on said upper shaft is the same size as said one sprocket wheel on said lower shaft which transmits drive to said upper shaft.

8. An implement as claimed in claim 6, wherein said feeding member is rotatably mounted in said hopper with its axis of rotation extending substantially parallel to the axes of rotation of said two shafts.

9. An implement as claimed in claim 6, wherein said two shafts are journaled in a casing of said transmission.

10. An implement as claimed in claim 6, wherein said transmission has coupling means for connection to said rotary spreading member through a drive shaft of said drive shaft means.

11. An implement as claimed in claim 10, wherein said coupling means comprises a direct drive between the power takeoff shaft and the drive shaft for said spreading member.

12. An implement as claimed in claim 6, wherein said two shafts for moving said feeding member are also positioned to be connectable with said coupling means to drive said spreading member.

13. An implement as claimed in claim 12, wherein said two shafts for driving said feeding member are connectable at their rear ends to said coupling means to function as alternative shafts for driving said spreading member.

14. An implement as claimed in claim 3, wherein a clutch mechanism is associated with said transmission to disconnect the drive force to said feeding member from the power takeoff shaft during operation of said spreading member.

15. An implement as claimed in claim 14, wherein said mechanism comprises a dog clutch movable lengthwise along one of said rotatable shafts of the transmission, said dog clutch cooperating with dogs that are fixed relative to a sprocket wheel rotatably mounted on the same shaft for transmitting drive to said feeding member.

16. An implement as claimed in claim 15, wherein said clutch mechanism is connected with a stop that is positioned in front of one of said rotatable shafts to prevent the connection of a power takeoff shaft to that shaft.

17. An implement as claimed in claim 16, wherein said stop is a turnably mounted bracket.

18. An implement as claimed in claim 17, wherein said bracket is connected to a manually operable control arm that also is connected to said clutch mechanism whereby said bracket prevents connection of the upper shaft to the power takeoff when said clutch mechanism disconnects drive force to said feeder member.

* * * * *